US008615206B2

(12) United States Patent
Meng

(10) Patent No.: US 8,615,206 B2
(45) Date of Patent: Dec. 24, 2013

(54) METHOD AND SYSTEM FOR A RADIO TRANSMISSION EMULATOR

(75) Inventor: Ming Michael Meng, Novi, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 646 days.

(21) Appl. No.: 12/828,075

(22) Filed: Jun. 30, 2010

(65) Prior Publication Data

US 2012/0003950 A1 Jan. 5, 2012

(51) Int. Cl.
*H04B 17/00* (2006.01)
(52) U.S. Cl.
USPC ..................................... 455/115.2; 455/67.12
(58) Field of Classification Search
CPC .................................................. H04B 17/0025
USPC .................. 455/115.2, 425, 115.1–115.4, 455/67.11–67.14, 296
See application file for complete search history.

(56) References Cited

U.S. PATENT DOCUMENTS

| | | | | |
|---|---|---|---|---|
| 4,403,350 A | * | 9/1983 | Imai et al. | 455/297 |
| 4,972,511 A | * | 11/1990 | Singer et al. | 455/226.1 |
| 5,933,776 A | | 8/1999 | Kirkpatrick | |
| 6,308,065 B1 | | 10/2001 | Molinari et al. | |
| 7,013,257 B1 | | 3/2006 | Nolan et al. | |
| 7,154,959 B2 | | 12/2006 | Erceg et al. | |
| 7,286,802 B2 | | 10/2007 | Beyme et al. | |
| 7,324,588 B2 | | 1/2008 | Green et al. | |
| 7,336,701 B2 | | 2/2008 | Kearney et al. | |
| 7,395,060 B2 | | 7/2008 | Liu | |
| 7,555,294 B2 | * | 6/2009 | Qi et al. | 455/425 |
| 7,620,368 B2 | * | 11/2009 | Wang et al. | 455/67.11 |
| 7,835,704 B2 | * | 11/2010 | Joung et al. | 455/67.11 |
| 2002/0118599 A1 | * | 8/2002 | Deveau | 367/13 |
| 2004/0071201 A1 | | 4/2004 | Klenner | |
| 2006/0229018 A1 | | 10/2006 | Mlinarsky et al. | |
| 2007/0177680 A1 | | 8/2007 | Green et al. | |
| 2008/0003949 A1 | * | 1/2008 | Voonna et al. | 455/67.14 |
| 2008/0084951 A1 | | 4/2008 | Chen et al. | |
| 2008/0108316 A1 | | 5/2008 | Joung et al. | |
| 2008/0144780 A1 | | 6/2008 | Bonnett et al. | |
| 2008/0274726 A1 | | 11/2008 | Simola | |
| 2008/0280566 A1 | | 11/2008 | Yen et al. | |
| 2009/0094492 A1 | | 4/2009 | Music et al. | |
| 2011/0217937 A1 | * | 9/2011 | Cook | 455/67.14 |
| 2012/0100813 A1 | * | 4/2012 | Mow et al. | 455/67.12 |

FOREIGN PATENT DOCUMENTS

| | | |
|---|---|---|
| EP | 1768284 | 3/2007 |
| GB | 2440165 | 1/2008 |
| JP | 2009065488 | 3/2009 |
| JP | 2009065489 | 3/2009 |

\* cited by examiner

*Primary Examiner* — Lana N Le
(74) *Attorney, Agent, or Firm* — Snell & Wilmer LLP

(57) ABSTRACT

The present invention relates to a method and system for a radio transmission emulator. In one embodiment, the present invention includes a radio transmission emulator system. The radio transmission emulator system includes a radio transmission emulator, an automobile, and/or a radio data analysis unit. The automobile can include a radio receiving unit. The radio transmission emulator generates a field simulation signal which simulates interferences. The field simulation signal is transmitted from the radio transmission emulator to the radio receiving unit. The radio receiving unit generates the radio data based on the field simulation signal. The radio data analysis unit analyzes the radio data to determine whether adjustments should be made to the radio receiving unit.

19 Claims, 4 Drawing Sheets

METHOD AND SYSTEM FOR A RADIO TRANSMISSION EMULATOR

BACKGROUND

1. Field

The present invention relates to a method and system for a radio transmission emulator.

2. Description of the Related Art

A conventional automobile may include a radio receiving unit which receives radio signals and generates radio data, such as music. A user of the automobile activates the radio receiving unit to listen to this radio data. However, radio signals are prone to interference from various sources which can impact the radio data generated by the radio receiving unit. This can, for example, degrade the quality of the music that the user wishes to listen, resulting in an unpleasant experience for the user.

To reduce the impact to the radio receiving unit caused by the interference, the radio receiving unit can be adjusted. To perform such adjustments, the effect of the interference on the radio receiving unit should be determined by exposing the radio receiving unit to that type of interference. Conventionally, automobiles were driven around the country to specific locations where a specific type of interference was determined to exist. However, this can be expensive and time consuming where there are many different types of interference, which are not all centrally located. Thus, the automobile may have to be driven to several states and through thousands of miles in order to perform testing on the radio receiving unit.

In addition, since the interferences are real live interferences, they are also prone to changing conditions and inaccuracy due to new construction or the removal of certain types of equipment. Thus, a certain location which may previously have a first type of interference may now have a second type of interference. Thus, the user will have to move to a different location to test the effects of the first type of interference on the radio receiving unit. This also adds to the expense and time necessary to test the radio receiving unit.

Thus, there is a need for a method and system for a radio transmission emulator.

SUMMARY

The present invention relates to a method and system for a radio transmission emulator. In one embodiment, the present invention includes a radio transmission emulator system. The radio transmission emulator system includes a radio transmission emulator, an automobile, and/or a radio data analysis unit. The automobile can include a radio receiving unit. The radio transmission emulator generates a field simulation signal which simulates interferences. The field simulation signal is transmitted from the radio transmission emulator to the radio receiving unit. The radio receiving unit generates the radio data based on the field simulation signal. The radio data analysis unit analyzes the radio data to determine whether adjustments should be made to the radio receiving unit. The present invention thus reduces the costs and time expended on testing the radio receiving unit since the field simulation signals can simulate the interferences that are used to test the radio receiving unit.

In one embodiment, the present invention is a radio transmission emulator including a clean radio signal unit configured to generate a clean radio signal, an interference radio signal unit configured to generate an interference radio signal, a mixing unit receiving the clean radio signal and the interference radio signal, and mixing the clean radio signal and the interference radio signal to generate a field simulation signal, and a processor connected to the clean radio signal unit, the interference radio signal unit, and the mixing unit, the processor configured to control the generation of the clean radio signal, the generation of the interference radio signal, and the mixing of the clean radio signal and the interference radio signal to generate the field simulation signal.

In another embodiment, the present invention is a radio transmission emulator system including a radio transmission emulator transmitting a field simulation signal, the radio transmission emulator including a clean radio signal unit configured to generate a clean radio signal, an interference radio signal unit configured to generate an interference radio signal, a mixing unit receiving the clean radio signal and the interference radio signal, and mixing the clean radio signal and the interference radio signal to generate the field simulation signal, and a processor connected to the clean radio signal unit, the interference radio signal unit, and the mixing unit, the processor configured to control the generation of the clean radio signal, the generation of the interference radio signal, and the mixing of the clean radio signal and the interference radio signal to generate the field simulation signal. The system can also include an automobile including a radio receiving unit receiving the field simulation signal and generating radio data in response to the field simulation signal.

In yet another embodiment, the present invention includes a method for emulating radio transmissions including generating a clean radio signal, generating an interference radio signal, and mixing the clean radio signal and the interference radio signal to generate a field simulation signal.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
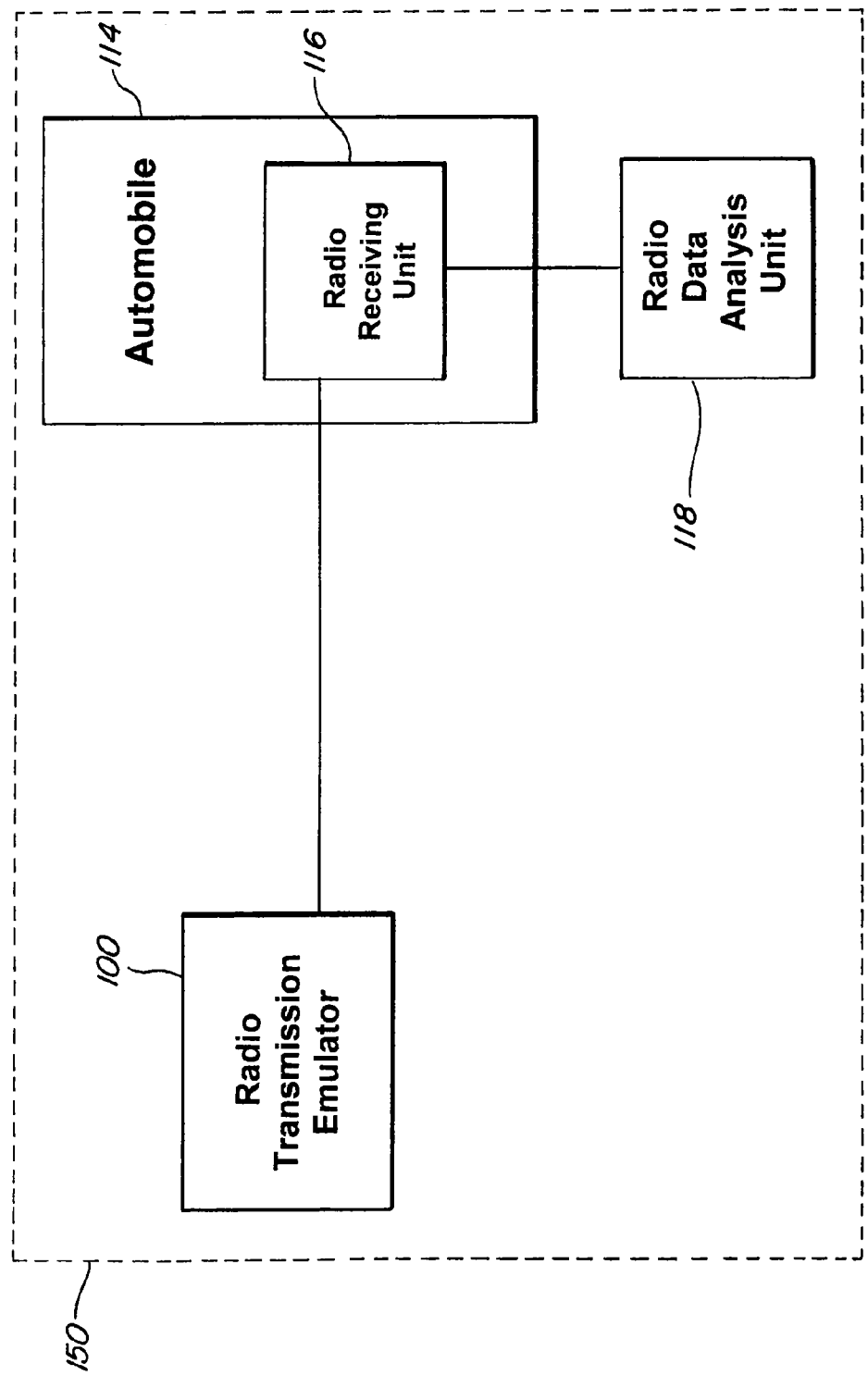
FIG. 1 is a box diagram of a radio transmission emulator system according to an embodiment of the present invention.

In one embodiment, the present invention includes a radio transmission emulator system 150 as seen in FIG. 1. The radio transmission emulator system 150 can include, for example, a radio transmission emulator 100, an automobile 114, and/or a radio data analysis unit 118. The automobile 114 can include, for example, a radio receiving unit 116.

The radio transmission emulator 110 can generate, for example, a field simulation signal which can be received by the radio receiving unit 116 in the automobile 114. The field simulation signal can simulate, for example, real conditions encountered by the radio receiving unit 116 in the automobile 114. For example, the radio transmission emulator 110 can simulate a weak signal, a strong signal, multipath interference, intermodulation interference, harmonics interference, power line interference, or any other type of interference or conditions which would be encountered by the radio receiving unit 116 in the automobile 114. The field simulation signal is described in greater detail below.

In one embodiment, the multipath interference can be caused, for example, by reflection of the radio signals. In one embodiment, the intermodulation interference can be caused by having multiple radio signals at the same time. For example, in the frequency modulation ("FM") band, a first radio station may operate at a frequency $f1=95$ MHz frequency, and a second radio station may operate at a frequency $f2=100$ MHz frequency. The $f1$ and $f2$ frequency may have a third order intermodulation of 105 MHz ($2\times f2-f1=2\times 100$ MHz$-95$ MHz$=105$ MHz). The 105 MHz can interact with other radio stations using the 105 MHz frequency and cause interference. Another third order intermodulation of $f1$ and $f2$ may also be generated at 90 MHz ($2\times f1-f2=2\times 95$ MHz$-100$ MHz$=90$ MHz). The 90 MHz frequency generated can interfere with other radio stations which utilize the 90 MHz frequency. In another embodiment, the intermodulation interference can occur, for example, between a first radio station operating at the 105.5 MHz frequency and a second radio station operating at the 105.8 MHz frequency.

In one embodiment, harmonics interference can occur, for example, in amplitude modulation ("AM") bands. For example, a radio station operating at a 760 kHz frequency can generate a 1520 kHz harmonics interference. Since the AM band can cover the 1520 kHz frequency, a radio station operating at a 1520 kHz frequency can be interfered with by the 1520 kHz harmonics interference generated by the 760 kHz frequency.

Figure 2:
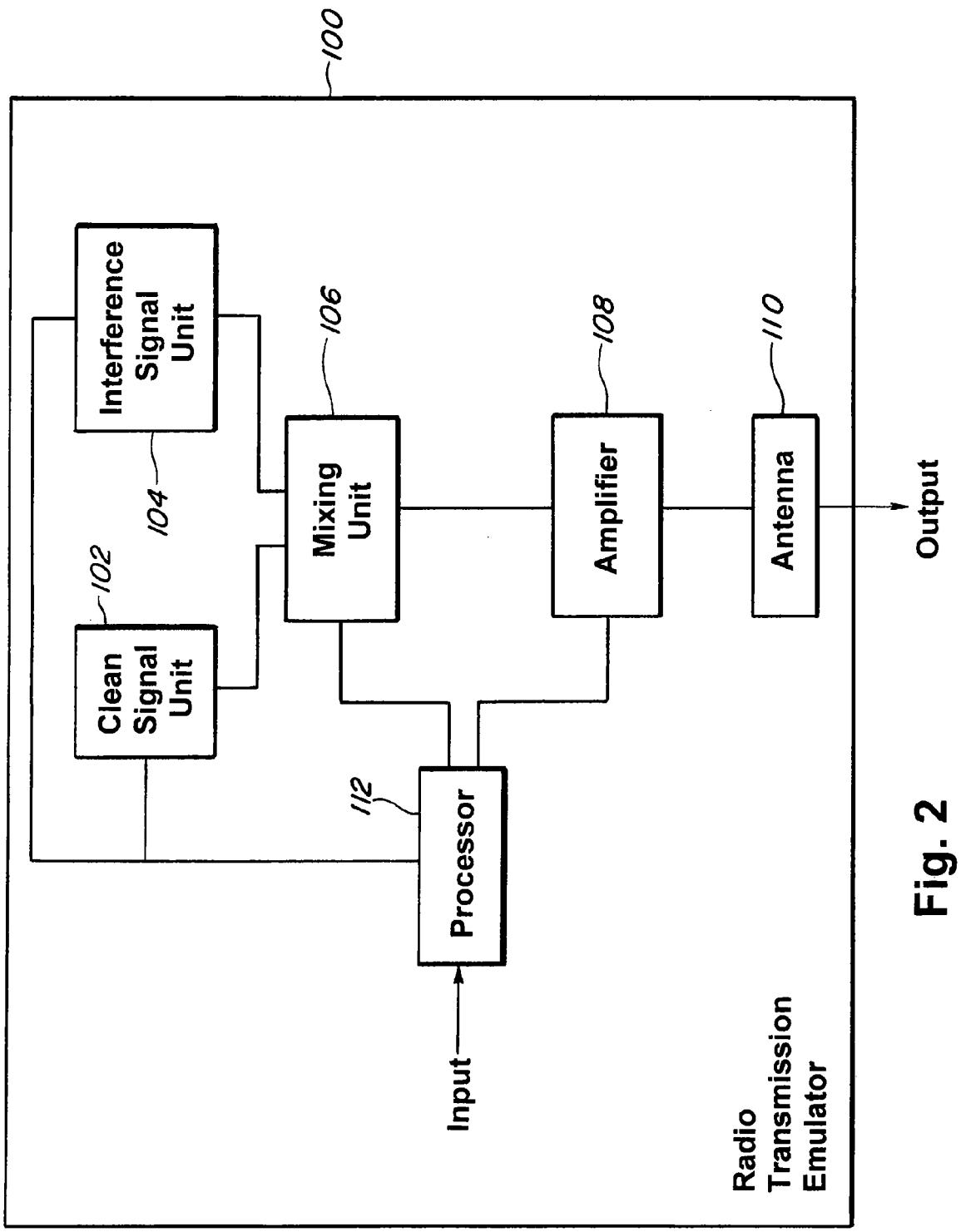
FIG. 2 is a box diagram of a radio transmission emulator according to an embodiment of the present invention.

The radio transmission emulator 100 can be seen, for example, in FIG. 2. The radio transmission emulator 100 can include a clean radio signal unit 102, an interference radio signal unit 104, a mixing unit 106, an amplifier 108, an antenna 110, and/or a processor 112. The clean radio signal unit 102 is connected, for example, to the mixing unit 106 and/or the processor 112. The clean radio signal unit 102 can generate a clean radio signal, based upon the instructions of the processor 112, which is transmitted to the mixing unit 106.

The interference radio signal unit 104 is connected, for example, to the mixing unit 106 and/or the processor 112. The interference radio signal unit 104 can generate, for example, an interference radio signal, based upon the instructions of the processor 112, which is transmitted to the mixing unit 106. In one embodiment, the clean radio signal unit 102 and/or the interference radio signal unit 104 are signal generators.

The mixing unit 106 is connected, for example, to the clean radio signal unit 102, the interference radio signal unit 104, and/or the processor 112. The mixing unit 106 can receive the clean radio signal and the interference radio signal and mix the interference radio signal to produce a field simulation signal.

The field simulation signal can be, for example, an amplitude modulation signal, a frequency modulation signal, or any other type of radio signals including HD radio signals, or even paid content such as Sirius® or XM® type of signals. The field simulation signal can be adjusted to simulate, for example, a target field simulation signal. The target field simulation signal can be, for example, a weak signal, a strong signal, multipath interference, intermodulation interference, harmonics interference, power line interference, or any other type of interference or conditions which would be encountered by the radio receiving unit 116 in the automobile 114. The field simulation signal is sent, for example, to the amplifier 108.

The amplifier 108 is connected, for example, to the processor 112, and/or the mixing unit 106. The amplifier 108 receives the field simulation signal and can adjust the amplification of the field simulation signal, as necessary, to simulate the target simulation signal. The amplification can include, for example, amplifying or attenuating the field simulation signal. The amount and type of amplification by the amplifier 108 to the field simulations signal can be controlled, for example, by the processor 112. By controlling the amplification by the amplifier 108, the field simulations signal can be adjusted to be a strong signal or a weak signal. The antenna 110 is connected, for example, to the amplifier 108 and can transmit the target simulation signal as an output.

The processor 112 is connected, for example, to the clean signal unit 102, the interference radio signal unit 104, the mixing unit 106, and/or the amplifier 108. The processor 112 can receive, for example, an input such as a target simulation signal. The processor 112 can then control the operations of the clean radio signal unit 102, the interference radio signal unit 104, the mixing unit 106, and/or the amplifier 108 so that the field simulation signal generated by the mixing unit 106 and/or the amplifier 108 simulates the target simulation signal.

For example, the processor 112 can increase or decrease the amount of clean radio signal generated by the clean radio signal unit 102 and sent to the mixing unit. The processor 112 can also change the type of clean radio signal generated by the clean radio signal unit 102 and sent to the mixing unit 106. The processor 112 can also increase or decrease the amount of interference radio signal generated by the interference radio signal unit 104 and sent to the mixing unit 106.

The processor 112 can also change the type of interference radio signal generated by the interference radio signal unit 104 and sent to the mixing unit 106. By changing the ratios and/or the types of the clean radio signals and the interference radio signals, a more accurate simulation of the target simulation signal can be achieved. For example, when the target simulation signal is multipath interference, the target simulation signal has different types and amounts of clean radio signals and interference radio signals compared to when the target simulation signal is an intermodulation interference. Thus, the ratio between the clean radio signal and the interference radio signals can be adjusted.

Referring back to FIG. 1, the automobile 114 can be, for example, a car with any type of engine. The automobile 114 can include, for example, a radio receiving unit 116. The radio receiving unit 116 can receive, for example, radio signals such as amplitude modulation signals (AM signals), frequency modulation signals (FM signals), or any other type of radio signals including HD radio signals, or even paid content such as Sirius® or XM® type of signals. Although the radio receiving unit 116 is shown in the automobile 114, the radio receiving unit 116 can be tested, for example, without being attached to the automobile 114. In one embodiment, the radio receiving unit 116 can be separate from the automobile 114.

The radio receiving unit 116 receives the radio signals and generates, for example, radio data. Thus, the radio receiving unit 116 can receive the field simulation signal which simulates the target simulation signal, and generate radio data. The radio data analysis unit 118 can receive the radio data and analyze the radio data to determine adjustments to the radio receiving unit. For example, if the radio data from the radio receiving unit 116 is not within predetermined tolerances for a field simulation signal that simulates a weak signal, a strong signal, multipath intereference, intermodulation interference, harmonics interference, and/or powerline interference, the radio receiving unit 116 can be adjusted to improve its ability to handle a weak signal, a strong signal, multipath intereference, intermodulation interference, harmonics interference, and/or powerline interference.

In one embodiment, the radio data analysis unit can be a signal analyzer. In another embodiment, instead of a radio data analysis unit, a person can listen to the radio data to determine whether any adjustments should be made.

Thus, the present invention allows the radio receiving unit 116 to be tested and adjusted without having to take the automobile 114 across the country or on extended road trips. This can reduce, for example, developmental costs of the radio receiving unit 116 since the automobile 114 does not need to be taken on expensive and extensive trips. Instead the testing and adjusting of the radio receiving unit 116 can be conducted in a relatively small area. In addition, the present invention allows more accurate adjustments since a larger number of interferences can be simulated by the field simulation signal.

Also, a particular type of interference can be tested without having to rely on guessing. For example, if a particular location was determined to test for intermodulation interference, that particular location may be suitable for the present time. However, the next year, the intermodulation interference may have disappeared or be altered. Thus, when the automobile is in that particular location the next year, it may not actually test for intermodulation interference. This can be expensive since the user will now have to drive around to determine a suitable location to test the intermodulation interference. However, with the present invention, the user does not need to drive the automobile 114 around to test the intermodulation interference for the radio receiving unit 116, but instead can either remain static or move around a relatively smaller area.

Figure 3:
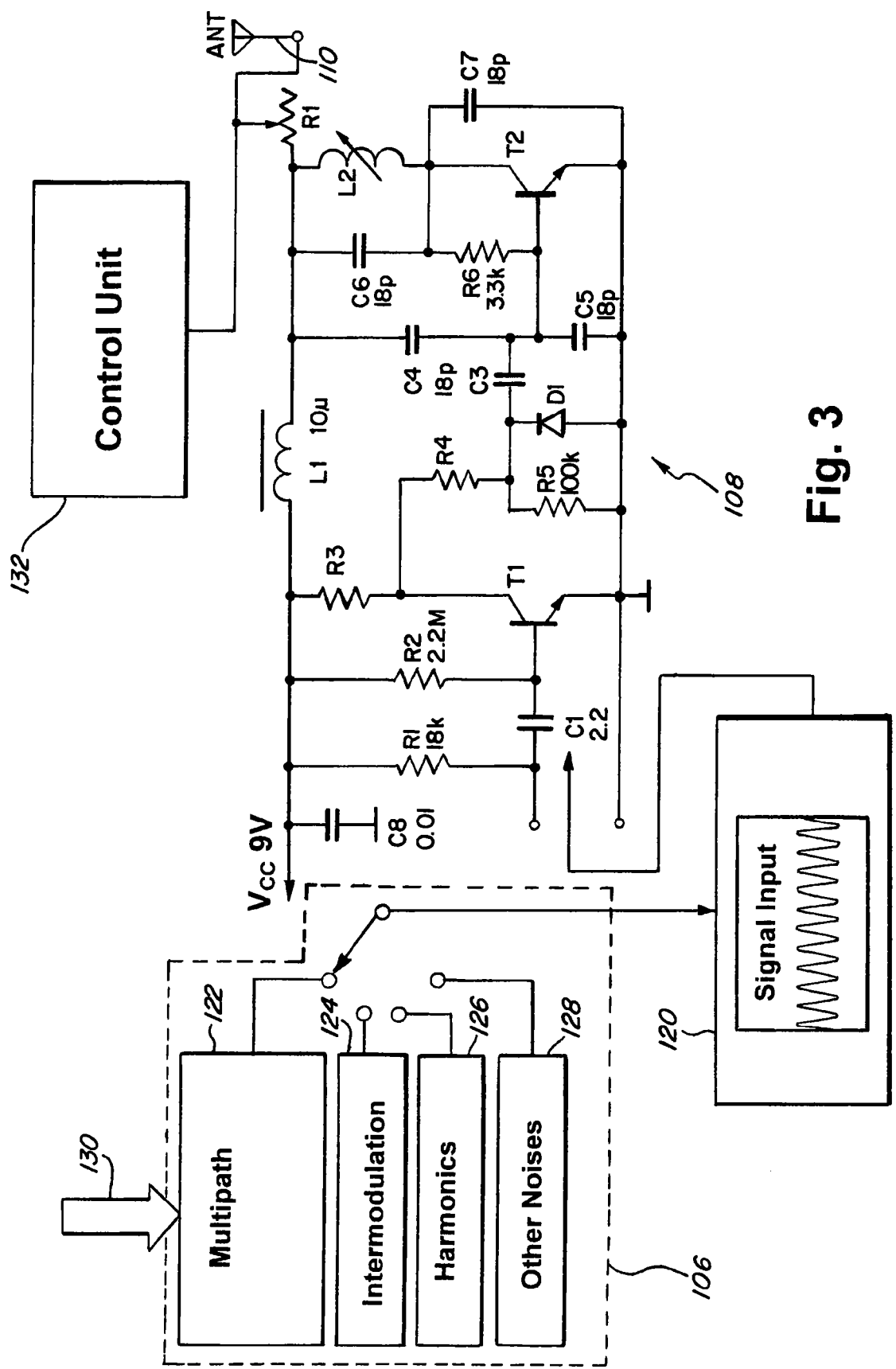
FIG. 3 depicts a box diagram of portions of the radio transmission emulator according to an embodiment of the present invention.

In one embodiment, portions of the mixing unit 106, the amplifier 108, and the antenna 110 can be seen, for example, in FIG. 3. As seen in FIG. 3, the mixing unit 106 can include, for example, a multipath unit 122, an intermodulation unit 124, a harmonics unit 126, and/or an other noises unit 128. The mixing unit 106 can receive, for example, an input signal 130. The input 130 can include, for example, the clean radio signal and the interference radio signal. A selection unit 120 can receive, for example, a signal input indicating which of the multipath unit 122, the intermodulation unit 124, the harmonics unit 126, and/or the other noises unit 128 should be active and transmit the field simulation signal to the amplifier 108.

The multipath unit 122 can generate, for example, a field simulation signal which simulates a multipath interference using the clean radio signal and/or the interference radio signal. The intermodulation unit 124 can generate, for example, a field simulation signal which simulates intermodulation interference using the clean radio signal and/or the interference radio signal. The harmonics unit 126 can generate, for example, a field simulation signal which simulates harmonics interference using the clean radio signal and/or the interference radio signal. The other noises unit 128 can generate, for example, a field simulation signal which simulates interference from other noises using the clean radio signal and/or the interference radio signal. The other noises can include, for example, power line noise. In one embodiment, the field simulation signal can be, for example, field simulation signals recorded from previous field testing, such as if data was actually recorded at various locations in prior field testing.

The amplifier 108 can receive the field simulation signal from the multipath unit 122, the intermodulation unit 124, the harmonics unit 126, and/or the other noises unit 128 and amplify the field simulation signal. The amplification of the field simulation signal is controlled, for example, by the control unit 132. The control unit 132 can receive instructions from the processor 112 regarding an amount of amplification of the field simulation signal. Thus, the field simulation signal and simulate, for example, a weak signal or a strong signal based on the amplification indicated by the processor 112. The antenna 110 receives the field simulation signal and transmits the field simulation signal as an output.

Figure 4:
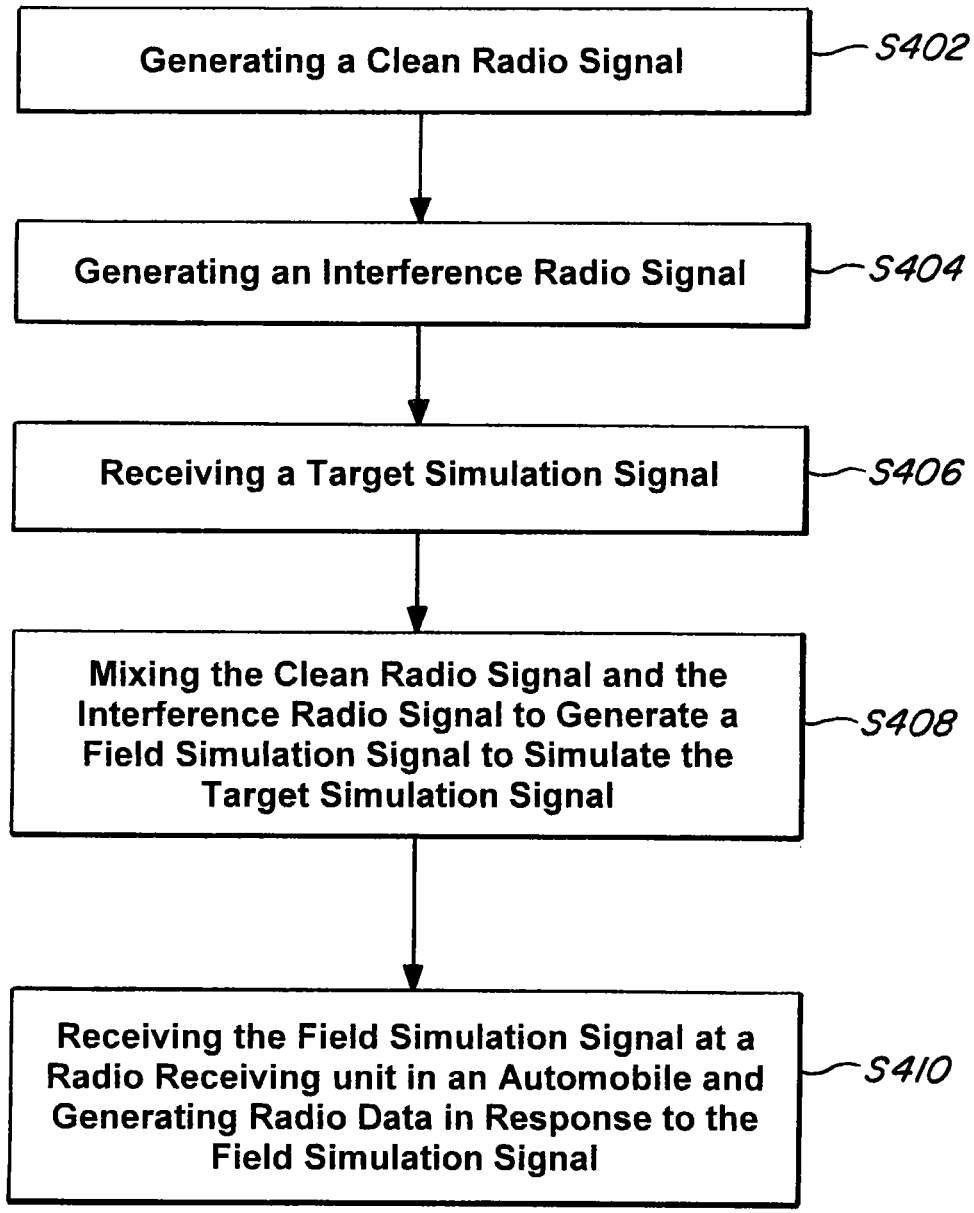
FIG. 4 depicts a process according to an embodiment of the present invention.

In one embodiment, the present invention is a process as shown in FIG. 4. In Step S402, a clean radio signal is generated. For example, the clean radio signal unit 102 can generate a clean radio signal. In Step S404, an interference radio signal is generated. For example, the interference radio signal unit 104 generates an interference radio signal.

In Step S406, a target simulation signal is received. For example, the processor 112 can receive a target simulation signal. In Step S408, the clean radio signal and the interference radio signal are mixed to generate a field simulation signal simulating the target simulation signal. For example, the mixing unit 106 can mix the clean radio signal and the interference radio signal to generate a field simulation signal simulating the target simulation signal.

In Step S410, the field simulation signal can be received at a radio receiving unit in an automobile and a radio data can be generated in response to the field simulation signal. For example, the radio receiving unit 116 in the automobile 114 can receive the field simulation signal and generate radio data. In one embodiment, the radio data can be further analyzed to determine adjustments to the radio receiving unit 116. This can be accomplished, for example, by a person or the radio data analysis unit 118. The person can, for example, review the radio data to determine if it is acceptable or unacceptable. In addition, the person can determine what types of problems or issues the radio receiving unit 116 has with regards to a specific type of interference.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A radio transmission emulator comprising:
    a clean radio signal unit configured to generate a clean radio signal;
    an interference radio signal unit configured to generate an interference radio signal;
    a mixing unit including a plurality of field simulation units and configured to receive the clean radio signal and the interference radio signal,
    a selection unit connected to the mixing unit and configured to select at least one of the plurality of field simulation units, wherein the mixing unit is further configured to mix the clean radio signal and the interference radio signal to generate a field simulation signal using the selected at least one of the plurality of field simulation units; and
    a processor connected to the clean radio signal unit, the interference radio signal unit, and the mixing unit, the processor configured to control the generation of the clean radio signal, the generation of the interference radio signal, the mixing of the clean radio signal and the interference radio signal, and the generation of the field simulation signal.

2. The radio transmission emulator of claim 1 wherein the processor receives a target field simulation signal.

3. The radio transmission emulator of claim 2 wherein the processor is configured to control the generation of the clean radio signal, the generation of the interference radio signal, and the mixing of the clean radio signal and the interference radio signal to generate the field simulation signal which substantially simulates the target field simulation signal.

4. The radio transmission emulator of claim 1 further comprising an amplifier connected to the mixing unit and the processor, the amplifier amplifying the field simulation signal.

5. The radio transmission emulator of claim 4 wherein the processor receives a target field simulation signal and the processor controls amplification of the field simulation signal to substantially simulate the target field simulation signal.

6. The radio transmission emulator of claim 4 further comprising an antenna connected to the amplifier for transmitting the field simulation signal.

7. The radio transmission emulator of claim 1 wherein the field simulation signal is an amplitude modulation signal.

8. The radio transmission emulator of claim 1 wherein the mixing unit includes at least one of:
    a multipath unit configured to simulate intermodulation interference using the clean radio signal and the interference radio signal,
    an intermodulation unit configured to simulate intermodulation interference using the clean radio signal and the interference radio signal, or
    a harmonics unit configured to simulate harmonics interference using the clean radio signal and the interference radio signal,
    wherein the selection unit selects at least one of the multipath unit, the intermodulation unit, or the harmonics unit.

9. The radio transmission emulator of claim 1 wherein the field simulation signal simulates at least one of a multipath interference, an intermodulation interference, a harmonics' interference, or a power line interference.

10. A radio transmission emulator system comprising:
    a radio transmission emulator transmitting a field simulation signal, the radio transmission emulator including
        a clean radio signal unit configured to generate a clean radio signal,
        an interference radio signal unit configured to generate an interference radio signal,
        a mixing unit including a plurality of field simulation units and configured to receive the clean radio signal and the interference radio signal,
        a selection unit connected to the mixing unit and configured to select at least one of the plurality of field simulation units, wherein the mixing unit is further configured to mix the clean radio signal and the interference radio signal to generate the field simulation signal using the selected at least one of the plurality of field simulation units, and
        a processor connected to the clean radio signal unit, the interference radio signal unit, and the mixing unit, the processor configured to control the generation of the clean radio signal, the generation of the interference radio signal, the mixing of the clean radio signal and the interference radio signal, and the generation of the field simulation signal; and
    an automobile including a radio receiving unit receiving the field simulation signal and generating radio data in response to the field simulation signal.

11. The system of claim 10 further comprising a radio data analysis unit configured to receive and analyze the radio data to determine adjustments to the radio receiving unit.

12. The system of claim 11 wherein the field simulation signal simulates at least one of a multipath interference, an intermodulation interference, a harmonics interference, or a power line interference.

13. The system of claim 10 wherein the processor receives a target field simulation signal, and the processor is configured to control the generation of the clean radio signal, the generation of the interference radio signal, and the mixing of the clean radio signal and the interference radio signal to generate the field simulation signal which substantially simulates the target field simulation signal.

14. The system of claim 13 further comprising an amplifier connected to the mixing unit and the processor, the amplifier amplifying the field simulation signal, wherein the processor controls amplification of the field simulation signal to substantially simulate the target field simulation signal.

15. The system of claim 13 wherein the field simulation signal is an amplitude modulation signal or a frequency modulation signal.

16. A method for emulating radio transmissions comprising:
   receiving, using a processor, a target simulation signal;
   generating, using a clean radio signal unit, a clean radio signal;
   generating, using an interference radio signal unit, an interference radio signal;
   mixing, using a mixing unit including a plurality of field simulation units, the clean radio signal and the interference radio signal;
   selecting, using a selection unit connected to the mixing unit, at least one of the plurality of field simulation units;
   generating, using the selected at least one of the plurality of field simulation units, a field simulation signal that simulates the target simulation signal; and
   adjusting, using the processor, the generating the clean radio signal, the generating the interference radio signal, the mixing the clean radio signal and the interference radio signal, and the generating the field simulation signal that simulates the target simulation signal.

17. The method of claim 16 further comprising receiving the field simulation signal at a radio receiving unit in an automobile and generating radio data in response to the field simulation signal.

18. The method of claim 17 further comprising analyzing the radio data to determine adjustments to the radio receiving unit.

19. The method of claim 18 wherein the field simulation signal simulates at least one of a weak signal, a strong signal, multipath interference, intermodulation interference, harmonics interference, or power line interference.

* * * * *